United States Patent [19]
Takagawa

[11] Patent Number: 6,105,799
[45] Date of Patent: Aug. 22, 2000

[54] THERMAL CONTAINER HAVING IMPROVED SUPPORTING UNITS THEREIN TO SECURELY HOLD THE INSULATED VESSEL WITHIN THE OUTER STRUCTURE THEREOF

[76] Inventor: Nobuyuki Takagawa, 5-12-20, Sagisu, Fukushima-ku, Osaka, Japan

[21] Appl. No.: 09/222,990

[22] Filed: Jan. 2, 1999

[51] Int. Cl.$^7$ ..................................................... A47J 41/02
[52] U.S. Cl. ........................ 215/21.1; 215/13.1; 215/395; 220/630; 220/592.27
[58] Field of Search .............................. 220/625, 592.27, 220/628, 395, 690; 215/12.1, 13.1, 395

[56] References Cited

U.S. PATENT DOCUMENTS

| | | | |
|---|---|---|---|
| 922,413 | 5/1909 | Friedrich | 215/12.1 |
| 1,116,993 | 11/1914 | Carlson | 215/12.1 |
| 1,186,544 | 6/1916 | Carson | 215/12.1 |
| 1,760,321 | 5/1930 | Seigheim | 215/12.1 |
| 2,837,232 | 6/1958 | Rossi | 215/13.1 |
| 2,893,584 | 7/1959 | Parker | 215/12.1 |
| 4,473,161 | 9/1984 | Zimmerman | 215/13.1 |
| 4,746,017 | 5/1988 | Howard et al. | 215/12.1 X |
| 4,768,664 | 9/1988 | Zimmermann | 215/12.1 |

FOREIGN PATENT DOCUMENTS

| | | | |
|---|---|---|---|
| 2267144 | 11/1993 | United Kingdom | 215/12.1 |

*Primary Examiner*—Stephen P. Garbe
*Assistant Examiner*—Tri M. Mai

[57] ABSTRACT

The present invention, the object of which is to provide a replacement unit for heat insulated pot for repairing heat insulated pot in the case where the inner bottle made of glass of the heat insulated pot is broken, is characterized in that it is a replacement unit for heat insulated pot composed of a metallic vacuum double bottle of a size storable in the cylindrical body of the heat insulated pot, a packing for putting the opening at the top end of the metallic vacuum double bottle in close contact with the communicating port at the neck of said body, and a bottom member for fixing said metallic vacuum double bottle in supported state to the body.

2 Claims, 4 Drawing Sheets

THERMAL CONTAINER HAVING IMPROVED SUPPORTING UNITS THEREIN TO SECURELY HOLD THE INSULATED VESSEL WITHIN THE OUTER STRUCTURE THEREOF

BACKGROUND OF THE INVENTION

1. Field of the invention

The present invention relates to a replacement unit for heat insulated pot, to be used in case of breaking of the inner bottle of a heat insulated pot for heat preserving hot water or cold water, etc., for example.

2. Description of the prior art

Glass is used for the inner bottle of some types of heat insulated pots. However, a problem was that an inner bottle made of glass is fragile against shocks such as falling, etc. and is easily broken. If the inner bottle is broken, the entire pot becomes useless even if other parts still remain sound and fit for use.

SUMMARY OF THE INVENTION

The main object of the present invention is to provide a replacement unit for heat insulated pot, enabling repair even in the case where the inner bottle made of glass is broken, for example.

The means for achieving the above object is characterized in that it is a replacement unit for heat insulated pot composed of a metallic vacuum double bottle of a size storable in the cylindrical body of the heat insulated pot, a packing for putting the opening at the top end of the metallic vacuum double bottle in close contact with the communicating port at the neck of said body, and a bottom member for fixing said metallic vacuum double bottle in supported state to the body.

This replacement unit for heat insulated pot shall preferably be constructed in such a way as to form, at the outer circumferential edge on the top face of said bottom member, supporting projections for supporting the outer circumferential edge of said metallic vacuum double bottle, so that the metallic vacuum double bottle may be supported by the supporting projections only.

Moreover, said packing may be formed in a way to be fit to the opening of the metallic vacuum double bottle.

Namely, according to the above-described construction, in case of breaking or damage of the inner bottle or when reduction of weight is desired, the bottom member attached to the bottom of the heat insulated pot is removed and the inner bottle and the packing at the top are taken out. And the packing and the metallic vacuum double bottle are housed in the pot body, and the bottom member is fixed to the body. The bottom member pushes up the metallic vacuum double bottle and presses the packing, and the mounting is completed. This makes it possible to reuse the heat insulated pot by utilizing other portions fit for use.

With a construction of the invention, the metallic vacuum double bottle is supported at its solid portion, thus preventing deformation due to push-up by the bottom member.

With the construction the invention, the mounting work can be performed very easily because it simply consists in fitting the packing to the opening of the metallic vacuum double bottle, and then housing the metallic vacuum double bottle (in the pot body).

DESCRIPTION OF THE PREFERRED EMBODIMENT

An embodiment of the present invention will be described in detail hereafter by referring to drawings.

Figure 1:
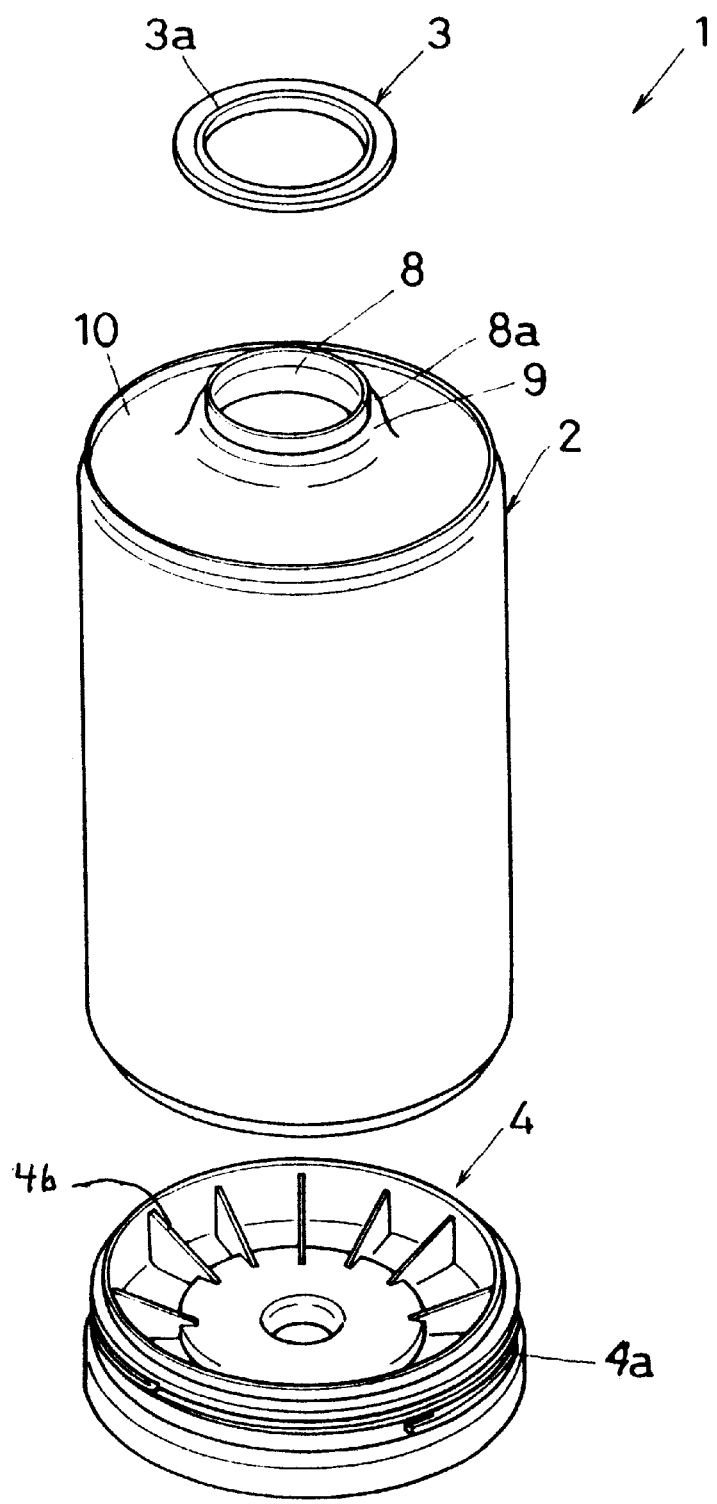
FIG. 1 is a perspective view of a replacement unit for heat insulated pot.

FIG. 1 is a perspective view of a replacement unit for heat insulated pot (hereinafter referred to as replacement unit), and this replacement unit 1 is composed of a metallic vacuum double bottle 2 (hereinafter referred to as bottle), a packing 3 and a bottom member 4.

Figure 2:
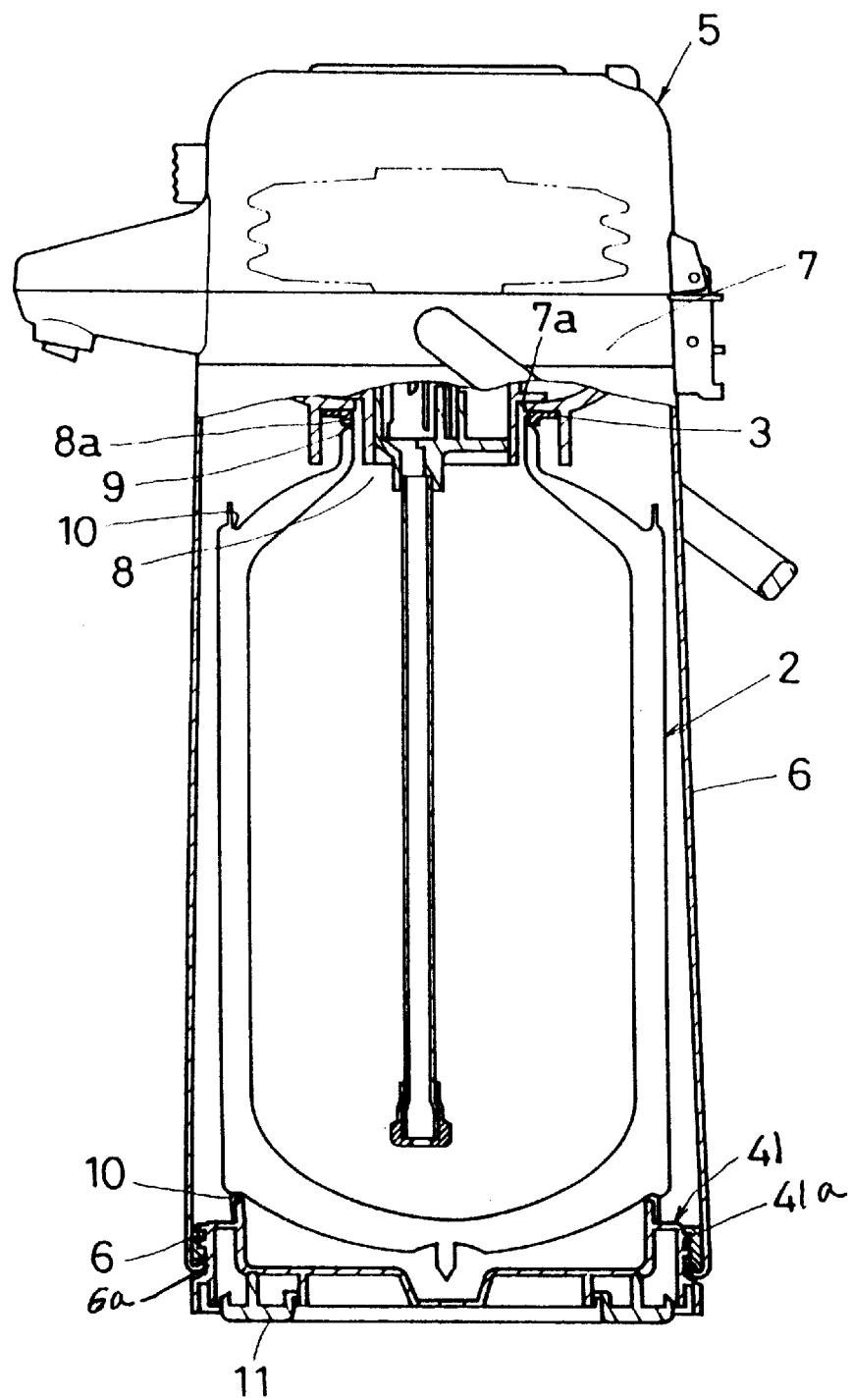
FIG. 2 is a sectional view of a replacement unit for heat insulated pot using a different bottom piece.

FIG. 2 shows a replacement unit for a heat insulated pot wherein the bottom piece or member 41 is slightly different from the bottom member 4 shown in FIG. 1, namely, that there is no circular donut shaped center piece nor any ribs 4b. The upper lip part 11 holds the U-shaped grooves 10 of the bottom of bottle 2.

The bottle 2 is of a size storable in the cylindrical body 6 of the heat insulated pot 5, and forms, at its top end, an opening 8 in the shape of an upward projection of a size corresponding to the communicating port 7a at the neck 7 inside the body 6, as shown in FIG. 1 or FIG. 2. And a stepped part 9 expanding to outside is formed under the circumferential wall 8a forming this opening 8. Moreover, at the outer, circumferential edge at both the top and bottom ends of the bottle 2 are formed U-shaped grooves 10, 10 to secure high rigidity of this portion.

Said packing 3, to be fit to the opening 8 at the top end of the bottle 2 to secure close contact with the neck 7 inside the body 6, is formed in the shape of a ring. And its section has a shape of the character L, so that the thicker inner circumferential side is fit to the circumferential wall Sa located higher than said stepped part 9 of the bottle 2, while the thinner outer circumferential side protrudes in the shape of a collar. On the top face is formed a convex stripe 3a in a circular shape. The thickness of the thicker inner circumferential side is set larger than the height of the circumferential wall 8a.

Said bottom member 4 or 41, made of synthetic resin and intended for fixing the bottle 2 in supported state to the body 6, is formed in the shape of a plate. And, on the outer circumferential face at an intermediate part in vertical direction is formed a male screw 4a or 41a (see FIGS. 1 and 2) to be connected to the female screw 6a provided at the opening edge at the bottom end of the body 6 (see FIG. 2). Moreover, at the top face are provided supporting projections 4b (see FIG. 1) to be fit to the U-shaped groove 10 at the bottom of the bottle 2 for supporting the bottle 2 without displacement in transversal direction, protruding in circular shape. The height of the supporting projections 4b shall preferably be equal to that of the U-shaped groove to secure a stronger support. At the bottom face is rotatably provided a ring-shaped supporting plate 11 so that the heat insulated pot 5 may change its direction in horizontal direction.

Figure 3:
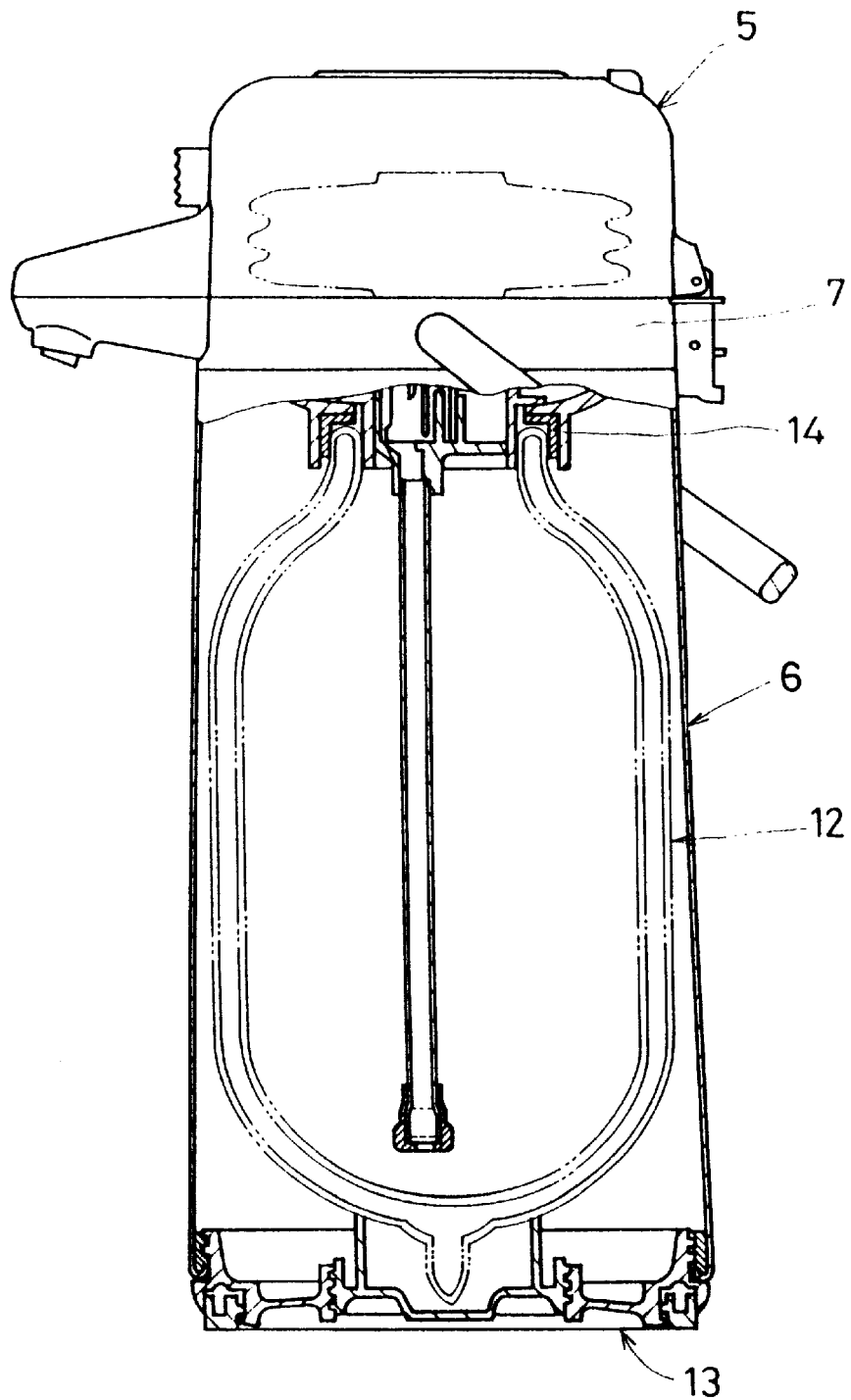
FIG. 3 is a sectional view of a prior art heat insulated pot before the use of replacement unit for heat insulated pot.

FIG. 3 shows a prior art heat insulated bottle. The instant invention can be used to replace a broken double bottle 12 by removing the upper part 14, bottle 12 and bottom part 13 as shown for the prior art heat insulated bottle in FIG. 3, and replacing these components with the invention upper packing 3, invention bottle 2, and invention bottom part or member 4.

Figure 4:
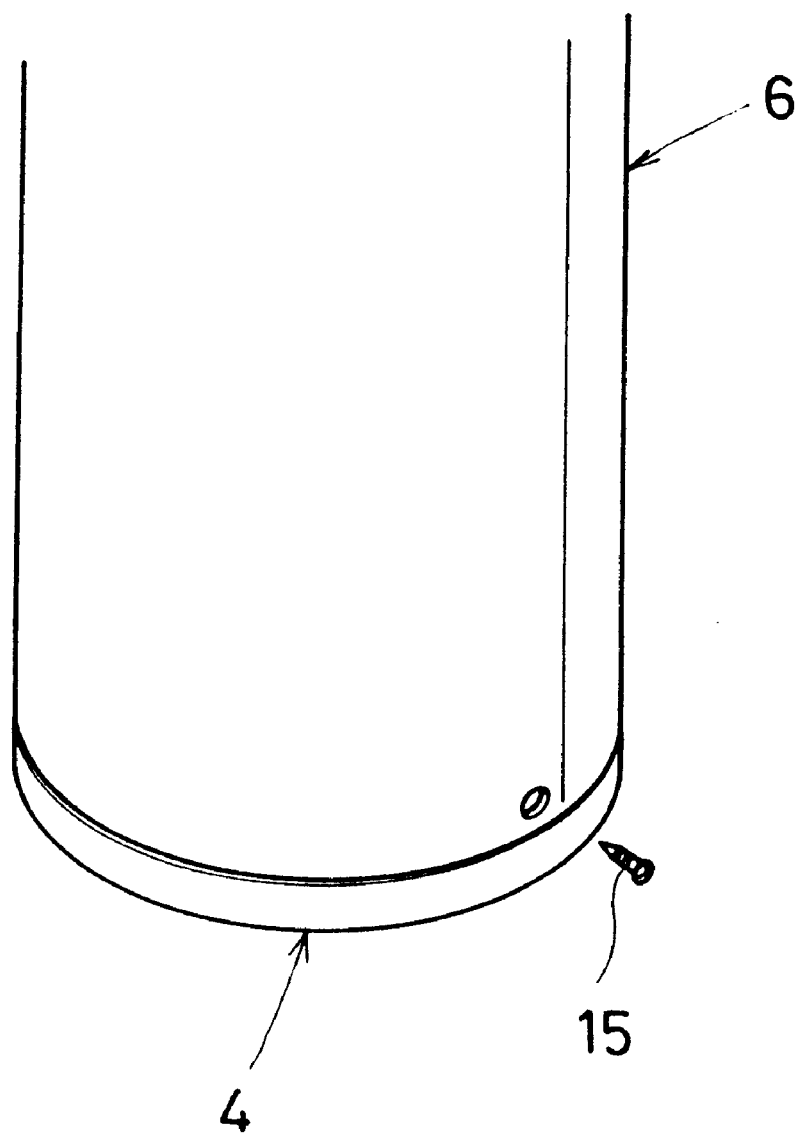
FIG. 4 is a perspective view showing the fixing structure at the bottom end of a heat insulated pot.

The replacement unit 1 constructed with such members is used in the case where the inner bottle 12 of a heat insulate pot 5 as shown in FIG. 3 was damaged and became useless or when reduction of weight is desired. Namely, the bottom member 13 attached to the bottom of the heat insulated pot 5 is removed, and the inner bottle 12 and the packing 14 at the top are taken out. And the packing 3 of the replacement unit 1 is fit to the opening 8 of the bottle 2, and then the bottle 2 is housed in the body 6 of the pot 5, and the bottom member 4 or 41 is fixed by screwing to the bottom end of the body 6 (see FIG. 1 and FIG. 2). After this fixing, a screw 15 is driven from outside at bottom end of the body 6 into the bottom member 4 or 41 for protection against turning (see FIG. 4). At the time of fixing, the bottom member 4 or 41 pushes up the bottle 2 and presses the packing 3, and the mounting is completed. This makes it possible to reuse the heat insulated pot 5 by utilizing other portions fit for use.

Moreover, on the bottom member 4 pushing up the bottle 2 are formed supporting projections 4*b* for supporting the U-shaped groove of high rigidity at the outer circumference of the bottle 2, thus preventing depression of the swollen bottom face of the bottle 2.

Furthermore, since the mounting of the bottle 2 in the body 6 can be performed after the packing 3 is fit in the opening 8 of the bottle 2, there is no need of mounting the packing 3 independently, thus greatly facilitating the mounting work.

While the heat insulated pot 5 is expressed with an air injection type in the above embodiment, a heat insulated pot of a type pouring with inclination may also be used.

What is claimed is:

1. A thermal container comprising:

an outer structure;

a vacuum bottle disposed within said outer structure and comprising a neck portion with an opening therein;

a resilient ring member disposed about said neck portion and between said bottle and said outer structure to provide a packing therebetween;

a bottom member disposed at the bottom of said outer structure and between the bottom of said bottle and said outer structure to provide a support for said bottle within said outer structure;

wherein said ring member comprises a cylinder with a hole in the center thereof and a first portion next to said hole with a first height, and a second portion next to said first portion and of a height less than said first height; and wherein said bottom member comprises a bottom portion and a top portion, said top portion comprising a plurality of vertically extending ribs of sloping heights extending upward from the outer edge of a raised donut shaped portion to the periphery of the bottom member.

2. The container of claim 1, wherein said bottom member comprises a wall extending around the periphery thereof, said wall being of high rigidity.

* * * * *